United States Patent [19]

Harris

[11] Patent Number: 5,175,242
[45] Date of Patent: Dec. 29, 1992

[54] PHENYLATED POLYIMIDES PREPARED FROM 3,6-DIARYLPYROMELLITIC DIANHYDRIDE AND AROMATIC DIAMINES

[75] Inventor: Frank W. Harris, Akron, Ohio

[73] Assignee: The University of Akron, Akron, Ohio

[21] Appl. No.: 315,327

[22] Filed: Feb. 24, 1989

[51] Int. Cl.$^5$ .............................................. C08G 69/26
[52] U.S. Cl. .................................. 528/353; 528/125; 528/126; 528/128; 528/170; 528/171; 528/172; 528/173; 528/174; 528/175; 528/179; 528/183; 528/185; 528/188; 528/220; 528/229; 528/350; 528/351
[58] Field of Search ............... 528/625, 126, 128, 170, 528/171, 172, 173, 174, 175, 178, 185, 183, 188, 220, 229, 350, 351, 353

[56] References Cited

U.S. PATENT DOCUMENTS

| | | | |
|---|---|---|---|
| 3,415,782 | 12/1960 | Irwin | 528/353 |
| 4,239,880 | 12/1980 | Darms | 528/125 |
| 4,485,140 | 11/1984 | Gannett et al. | 528/183 |
| 4,640,972 | 2/1987 | Irwin | 528/188 |

FOREIGN PATENT DOCUMENTS 0297808  1/1989  European Pat. Off. .
0315479  5/1989  European Pat. Off. .

OTHER PUBLICATIONS

"Phenylated Monomer Synthesis: Trans-2,3-Diphenyl-2-Butenedial and 3,6-Diphenylpyromellitic Dianhydride", Masters Thesis 1986, Shaowo Liang.

Primary Examiner—John Kight, III
Assistant Examiner—P. Hampton-Hightower
Attorney, Agent, or Firm—Oldham, Oldham & Wilson Co.

[57] ABSTRACT

A new class of soluble phenylated polyimides made from 3,6-diarypyromellitic dianhydride and process for the manufacture of the 3,6-diarypyromellitic dianhydride starting material. The polyimides obtained with said dianhydride are readily soluble in appropriate organic solvents and are distinguished by excellent thermal, electrical and/or mechanical properties making the polyimides ideally suited as coating materials for microelectronic apparatii, as membranes for selective molecular separation or permeation or selective gas separation or permeation, or as reinforcing fibers in molecular composites, or as high modulus, high tensile strength fibers.

28 Claims, No Drawings

PHENYLATED POLYIMIDES PREPARED FROM 3,6-DIARYLPYROMELLITIC DIANHYDRIDE AND AROMATIC DIAMINES

This invention was made with Government support under contract NAG-1-448 awarded by NASA. The Government has certain rights in this invention.

TECHNICAL FIELD

This invention describes the manufacture of 3,6-diaryl-substituted pyromellitic dianhydride polyimides, sometimes referred herein as polypyromellitimides, and a process for the manufacture of 3,6-diarylpyromellitic dianhydride.

BACKGROUND ART

The present invention relates to new soluble phenylated polyimides, their use as coatings, solution castable films, gas or molecular separation membranes, high modulus, high tensile strength fibers, and as molecular composite reinforcing agents and a process for the manufacturing of 3,6-diarylpyromellitic dianhydride.

Polyimides are condensation polymers having the following repeat unit formula (I) below:

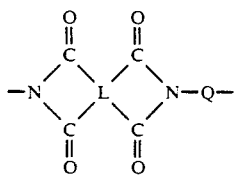

(I)

where L is a tetravalent organic radical and Q is a divalent organic radical. L can either be a simple tetra substituted benzene radical or a tetra substituted polynuclear aromatic radical. Q is normally an aromatic radical.

Polyimides are used in industry as binders for advanced composite materials especially in aerospace industries. Polyimides are also useful as components which require excellent thermal, electrical and/or mechanical properties. For general discussion of polyimides preparation, characterization and applications see *Polyimides, Synthesis, Characterization and Applications*, K. L. Mittal, ed Plenum, N.Y. 1984.

Polyimides based on pyromellitic dianhydride (II)

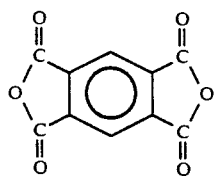

(II)

and 2,2-bis[3,5-dichloro-4-(4-aminophenyloxy)-phenyl]-propane(III)

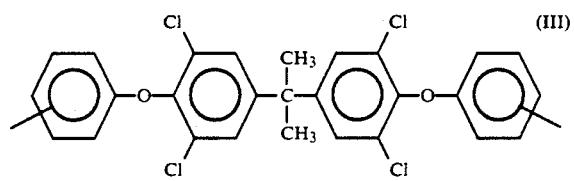

(III)

and various copolyimides using other aromatic diamines are disclosed in U.S. Pat. No. 4,485,140 to Gannett et al (E. I. DuPont de Nemours and Co.) and preparation of two such polyimides are described in the examples.

Polyimides based on more exotic diamines such as 2,2'-di-(p-aminophenyloxy)-diphenyl (IV)

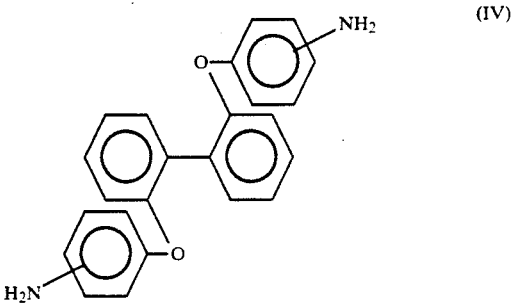

(IV)

and various dianhydrides are disclosed in U.S. Pat. No. 4,239,880 to Darms (Ciba-Geigy Corp.), and preparation of three such polyimides are described in the examples.

3,6-diphenylpyromellitic dianhydride,

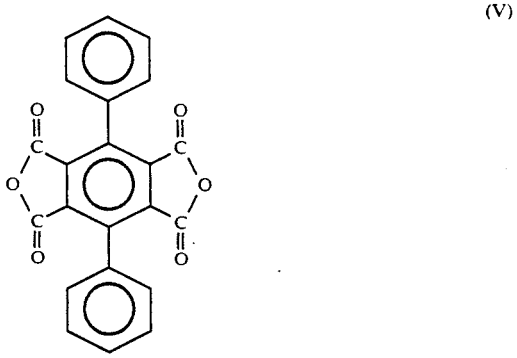

(V)

hereafter sometimes referred to as DPPMDA, has been made in poor yields by S. Liang and reported in his master's thesis: Phenylated Monomer Synthesis: trans-2,3-diphenyl-2-butenedial and 3,6-diphenyl pyromellitic dianhydride. However, neither the reported synthesis of DPPMDA or the two patents dealing with various polyimides suggest that polyimides derived from 3,6-diarylpyromellitic dianhydride will be readily soluble in certain organic solvents without loss of other important properties.

It thus appears desirable to produce polyimides based on 3,6-diarylpyromellitic dianhydride which would be soluble, have high molecular weight, high modulus, and good properties as protective coatings for microelectronics, as solution castable films, as membranes for molecular and gas separations, or as reinforcing agents in molecular composites, or as high modulus, high tensile strength fibers.

DISCLOSURE OF THE INVENTION

It is an object of this invention to provide novel, high modulus, soluble phenylated polyimides based on 3,6-diarylpyromellitic dianhydrides.

A further object of this invention is to provide novel copolymers comprising repeat units based on 3,6-diarylpyromellitic dianhydrides and repeat units based on other organic dianhydrides.

A further object of this invention is to provide novel copolymers based on 3,6-diarylpyromellitic and two or more organic diamines.

A further object of this invention is to provide a usable process for the manufacturing of 3,6-diarylpyromellitic dianhydride starting material.

The novel phenylated polyimides having the following repeat unit formula (VI)

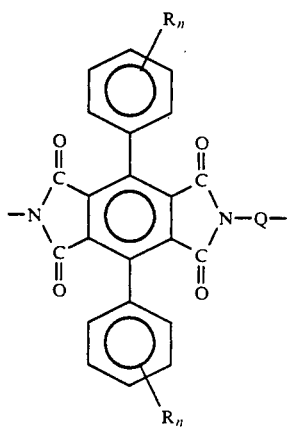
(VI)

(where R and n are described herein) are prepared by mixing together a near one to one mixture of a 3,6-diarylpyromellitic dianhydride (VII)

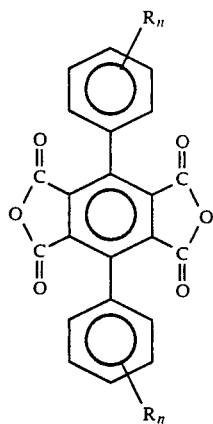
(VII)

with an aromatic diamine (VIII)

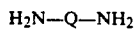 (VIII)

where R is a halogen atom, a halogenated alkyl group with between 1 to 4 carbons, an acid or acid derivative, or nitro group and n is 0 or an integer from 1 to 4, diamine (VIII), and where Q is a divalent organic radical selected from the group consisting of:

 (i)

where the terminal covalent bonds are either in the meta or para position with respect to each other;

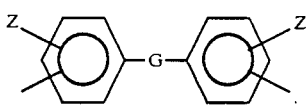 (ii)

where G is O, S, keto, sulfoxy, sulfonyl or a linking bond, Z is hydrogen or halogen atom or alkyl, alkoxy or halogenated alkyl group with between 1 to 4 carbons and both terminal covalent bonds are located in the meta or para position with respect to G and Z is located in the ortho or meta position with respect to the covalent bond;

 (iii)

where $G'$ is O, S or an isopropylidine group, $Z'$ is hydrogen or phenyl, and both terminal covalent bonds are either in the ortho or meta or para position with respect to G;

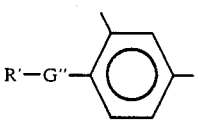 (iv)

where $G''$ is O or S and $R'$ is phenyl, biphenyl, or napthyl;

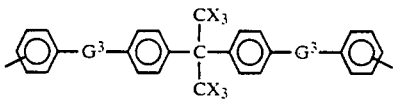 (v)

where $G^3$ is O or S, and both terminal covalent bonds are in the ortho or meta position with respect to $G^3$ and X is H, F, Cl or Br;

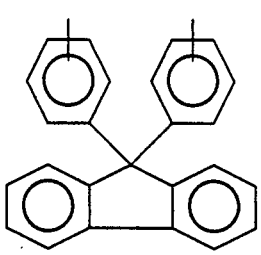 (vi)

where both terminal covalent bonds are in the para or meta position with respect to the fluorene ring covalent bond.

In general, the polyimide formation reaction can occur via two alternate pathways as shown below in (1) and (2) for first pathway and (i), (ii) and (iii) for the second pathway.

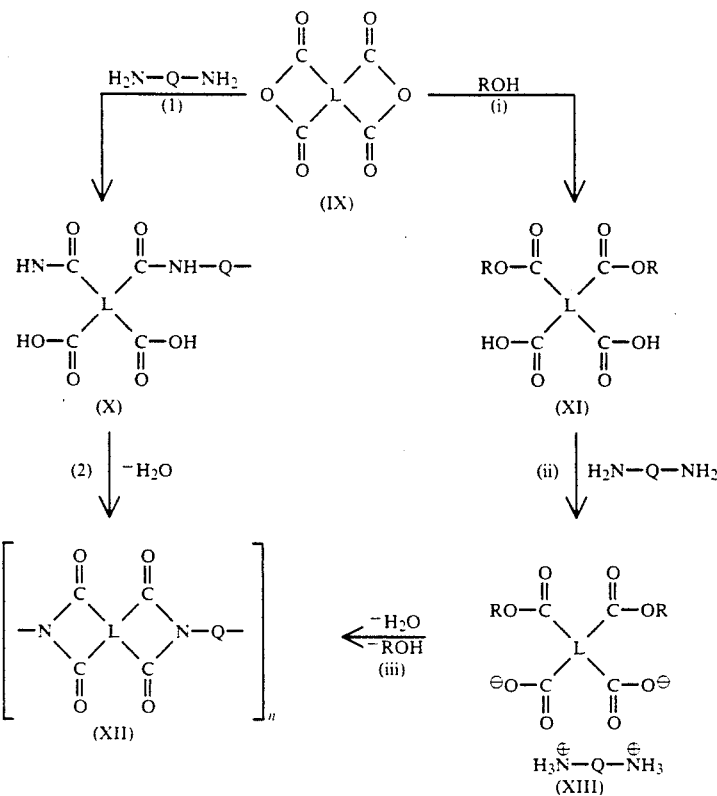

Dianhydride (IX) may be first converted into polyamide acid (X) by reaction with diamine $NH_2QNH_2$, which can then be chemically or thermally dehydrated to polyimide (XII). Alternately, dianhydride (IX) is first esterified with ROH (e.g. ethanol, $R=C_2H_5$) to diester-diacid (XI) which forms salt (XIII) with diamine $NH_2QNH_2$. Thermal cyclization of salt (XII) then yields polyimide (XII) with loss of water and the appropriate alcohol.

Besides the two pathways described above for polyimide formation, a one-step synthetic method can be used which involves the direct conversion of (IX) into (XII) in an appropriate refluxing organic solvent such as N-methylpyrollidone, m-cresol and the like.

The 3,6-diarylpyromellitic dianhydrides may be prepared by the following reaction scheme in which the synthesis of 3,6-diphenylpyromellitic dianhydride is taken as a representative example:

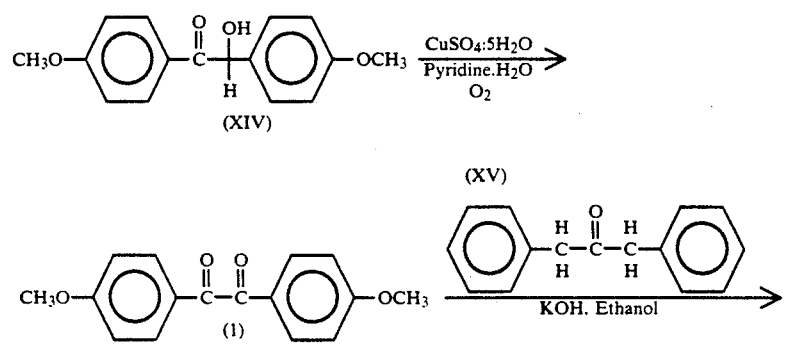

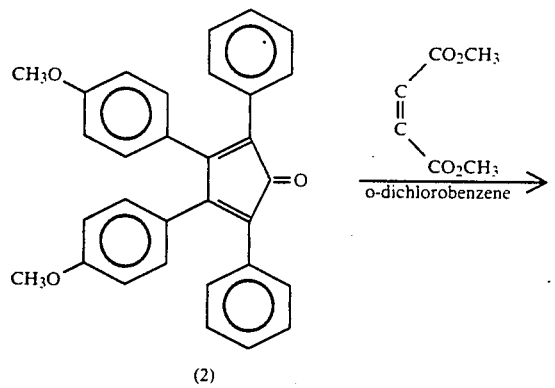
(2)
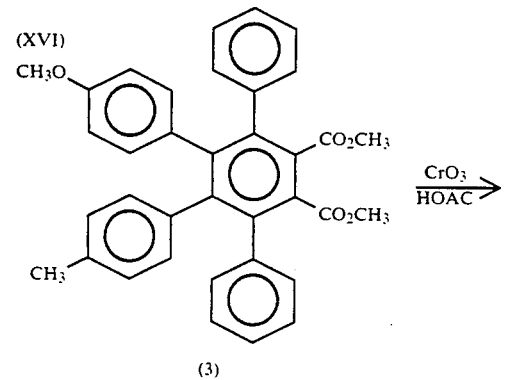
(3)
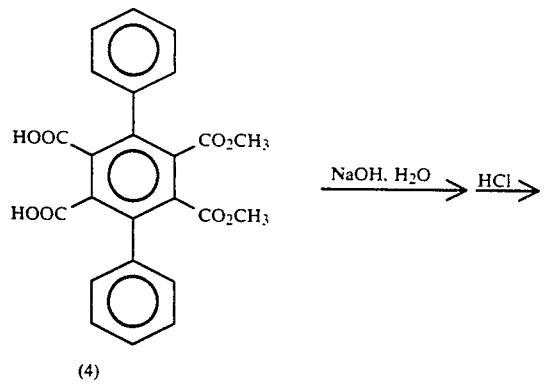
(4)
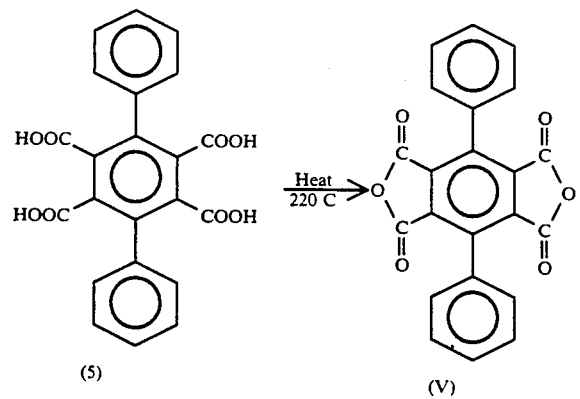
(5)     (V)
Thus, 4,4'-dimethylbenzoin (XIV) is treated with cupric sulfate pentahydrate in aqueous pyridine in the presence of air or oxygen to give intermediate (1). Intermediate (1) is converted to intermediate (2), by reaction with 1,3-diphenyl-2-propanone (XV), in the presence of ethanolic KOH. Intermediate (2) is converted to intermediate (3) by reaction with dimethyl-2-butynedioate (XVI)

in o-dichlorobenzene. Intermediate (3) is oxidized with $CrO_3$ in acetic acid (HOAC) to give intermediate (4) which, upon treatment with refluxing NaOH followed by HCl neutralization, is converted into intermediate (5). The 3,6-diarylpyromellitic dianhydride is finally made by dehydrating intermediate (5) thermally. The above scheme may be used to synthesize a number of analogs by using a substituted version of 1,3-diphenyl-2-propanone (XV). Such substituted analogs can be generally described by the formula (XVa) below

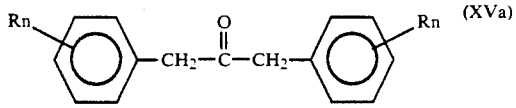

where R and n have the previously assigned meanings.

The polymers according to the invention can be homopolymers consisting of units of formula (VI) above, or random copolymers having units of the formula (VI) and units of the formula (XVII)

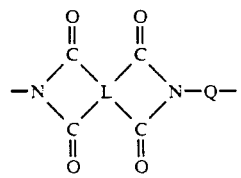

where L is the organic nucleus of a dianhydride selected from the group consisting of pyromellitic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, 3,3',4,4'-diphenyl-tetracarboxylic acid dianhydride, bis (2,3-dicarboxyphenyl)-methane dianhydride, bis(2,5,6-tri-fluoro-3,4-dicarboxyphenyl)methane dianhydride, 2,2-bis-(2,3-dicarboxyphenyl)-propane dianhydride, bis(3,4-dicarboxyphenyl) ether dianhydride, bis-(3,4-dicarboxyphenyl)-sulfone dianhydride, N,N-(3,4-dicarboxyphenyl)-N-methylamine dianhydride, bis(3,4-dicarboxyphenyl)-diethylsilane dianhydride, 2,3,6,7- and 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride and the like, and Q is a divalent organic radical as described previously, or a random copolymer consisting of units of formula (VI) where Q is two or more divalent organic radicals as described previously. Random copolymers according to the invention, can be prepared with repeating units of formula (VI) and repeating units of formula (XVII) said dianhydride of formula (VII) constituting about 50 percent of the combined molar quantities of said dianhydride of formula (VII) and one of the dianhydrides listed above, and the number of said units of formula (VI) being at least about 50 percent of the combined number of said units of formula (VI) and said units of the formula (XVII) where K is as described previously.

BEST MODE FOR CARRYING OUT THE INVENTION

Applicants have found that 3,6-diarylpyromellitic dianhydride polyimides represent a class of polyimides which are soluble in organic solvents. Because these polyimides are soluble and maintain standard polyimide properties such as excellent thermal stability, high modulus and high glass transition temperatures, they are ideally suited for coating microelectronic components via solution deposition. Films and membranes can also be easily cast from solutions of said polyimides. Some may also find application as reinforcing agents in molecular composites because of their high mechanical rigidities.

In preparing the diaryl substituted pyromellitic polyimides, a near one to one mixture of a 3,6-diarylpyromellitic dianhydride such as 3,6-diphenylpyromellitic dianhydride formula (V) below

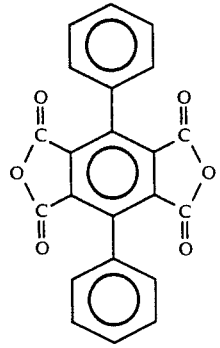

and a diamine such as 4,4'-oxydianiline (XVIII)

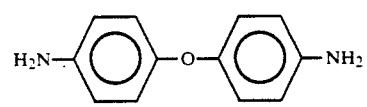

are allowed to react according to one of the above described reaction pathways including the one-step pathway. Upon completion of the polymerization reaction, a polyimide having the following repeat unit is formed shown by formula (XIX) below (XIX)

The invention will be better understood by reference to the following examples:

EXAMPLE 1

Polymerization (Two Step Method)

The 3,6-diphenylpyromellitic dianhydride (1.35 m mol) is added to a stirred solution of 1.35 m mol of the 4,4'-oxydianiline (ODA) in N-methylpyrollidone (NMP) (solids content 15 percent W/V) under $N_2$ at ambient temperature. After the solution is stirred for 24 hours, 2.97 m mol of pyridine and 2.97 m mol of acetic anhydride is added. After this solution is stirred for an addition 24 hours, it is diluted with 8 ml of NMP and then added to 600 ml of stirred ethanol. The polyimide is collected by filtration, washed with ethanol and ether, and then dried at 100° C. under reduced pressure for 24 hours. The resulting polyimide has an intrinsic viscosity of 0.37 in NMP at 30° C.

EXAMPLE 2

Analogously to the procedure described in Example 1, 1.35 m mol of the DPPMDA is reacted with 1.35 m mol of 4,4'-diaminodiphenylmethane. The resulting polyimide has an intrinsic viscosity of 0.45 in NMP at 30° C.

EXAMPLE 3

Analogously to the procedure described in Example 1, 1.35 m mol of the DPPMDA is reacted with 1.35 m mol of 4,4'-diaminobiphenyl. The resulting polyimide has an intrinsic viscosity of 0.33 in NMP at 30° C.

EXAMPLE 4

Analogously to the procedure described in Example 1, 1.35 m mol of the DPPMDA is reacted with 1.35 m mol of 3,3'-dimethoxy-4,4'-diaminobiphenyl. The resulting polyimide has an intrinsic viscosity of 0.24 in NMP at 30° C.

EXAMPLE 5

Polymerization (One Step Method)

The DPPMDA (1.35 m mol) is added to a stirred solution of 1.35 m mol of the ODA in m-cresol containing 6 drops of isoquinoline (solids content 8.5 percent W/V) under nitrogen at ambient temperature. After the solution is stirred for 3 hours, it is heated to near 200° C. and maintained at that temperature for 3 hours. During this time, the water of imidization is allowed to distill from the reaction mixture. After the solution is allowed to cool to ambient temperature, it is diluted with 20 ml of m-cresol and then slowly added to IL of vigorously-stirred 95 percent ethanol. The polymer that precipitates is collected by filtration, washed with ethanol and ether, and dried under reduced pressure at 100° C. for 24 hours. The soluble polymers are reprecipitated from trichloroethane with ethanol. The resulting polyimide has an intrinsic viscosity of 2.40 in NMP at 30° C.

EXAMPLE 7

Analogously to the procedure described in Example 2, 1.35 m mol of the DPPMDA is reacted with 1.35 m mol of 4,4'-diaminodiphenylmethane. The resulting polyimide has an intrinsic viscosity of 1.12 in NMP at 30° C.

EXAMPLE 8

Analogously to the procedure described in Example 2, 1.35 m mol of the DPPMDA is reacted with 1.35 m mol of 1,3-diaminobenzene. The resulting polyimide has an intrinsic viscosity of 0.96 in NMP at 30° C.

EXAMPLE 9

Analogously to the procedure described in Example 1, 1.35 m mol of the DPPMDA is reacted with 1.35 m mol of 1,4-bis(4-aminophenoxy)-2-phenylbezene. The resulting polyimide has an intrinsic viscosity of 0.81 in NMP at 30° C.

EXAMPLE 10

Analogously to the procedure described in Example 1, 1.35 m mol of the DPPMDA is reacted with 1.35 m mol of 9,9-bis(4-aminophenyl)fluorene. The resulting polyimide has an intrinsic viscosity of 1.15 in NMP at 30° C.

EXAMPLE 11

Analogously to the procedure described in Example 1, 1.35 m mol of the DPPMDA is reacted with 1.35 m mol of 9,9-bis(4-aminophenyl)fluorene. The resulting polyimide has an intrinsic viscosity of 1.15 in NMP at 30° C.

EXAMPLE 12

Analogously to the procedure described in Example 1, 1.35 m mol of the DPPMDA is reacted with 1.35 m mol of 3,3'-dimethoxy-4,4'-diaminobiphenyl. The resulting polyimide has an intrinsic viscosity of 0.24 in NMP at 30° C.

EXAMPLE 13

Analogously to the procedure described in Example 1, 1.35 m mol of the DPPMDA is reacted with 1.35 m mol of 2,2'-bis(trifluoromethyl)-4,4'-diaminobiphenyl. The resulting polyimide has an intrinsic viscosity of 2.40 in NMP at 30° C.

EXAMPLE 14

Preparation of 3,6-Diphenylpyromellitic Dianhydride 4,4'-Dimethoxybenzil (1)

The compound is prepared from 4,4'-dimethoxybenzoin by the procedure described in Clarke et al in "Organic Syntheses," Coll., Vol. 1, H. Gilman, Ed., Wiley, N.Y., 1975, pp 421-428: mp 132°-133° C. (mp 133° C. reported in Macaione et al, *Synthesis*, 716 (1974))

2,5-Diphenyl-3,4-bis(4-methoxyphenyl)-2,4-cyclopentadiene-1-one (2)

The tetracyclone is prepared from 4,4'-dimethoxybenzil and 1,3-diphenylacetone (XV) by the procedure described in "Organic Syntheses," Coll., Vol. 3, E. C. Horning, Ed., Wiley, N.Y., 1955, pp 806-807: mp 227°-228° C. (mp 226.8-227.2° C. reported in Coan et al *J. Am. Chem. Soc.*, 77, 60 (1955).

Dimethyl 3,6-diphenyl-4,5-bis(4-methoxyphenyl) phthalate (3)

A solution of 10.0 g (22.5 m mol) of 2 and 4.25 g (29.9 m mol) of dimethyl-2-butynedioate (XVI) in 50 ml of o-dichlorobenzene is stirred and heated at reflux for 3 hours. After the mixture is allowed to cool to 100° C., 75 ml of 95 percent ethanol is added. The solution is then allowed to cool to room temperature during which time a white powder forms. The product is collected by filtration and recrystallized from a 1:3 mixture of $CHCl_3$ and ethanol, to afford 10.7 g (85 percent) of white powder: mp 231°-234° C.; IR (KBr) 1750 cm$^{-1}$ (C=O), 1250 cm$^{-1}$ (C—O).

Dimethyl 4,5-dicarboxy-3,6-diphenylphthalate (4)

A solution of 10.0 g (17.9 m mol) of 3 in 120 ml of acetic acid is stirred and heated to 80°-90° C. A solution of 3.85 g (385 m mol) of chromic acid in 35 ml of $H^2O$ and 30 ml of acetic acid is then added dropwise over a 6 hour period. After the reaction mixture is allowed to cool to ambient temperature, it is added to 2L of 2N $Na_2CO_3$. The resulting mixture is heated to reflux and then allowed to cool. The precipitate that forms is collected by filtration. The yellow filtrate is acidified with concentrated HCl. Another precipitate forms that is also collected by filtration. The precipitates are combined, washed with concentrated HCl and $H_2O$, and then dried at 60° C. under reduced pressure. The product is recrystallized from toluene to afford 2.4 g (31 percent) of white flakes: mp 196°-198° C.; IR (KBr) 3600-2400 cm$^{-1}$ (COOH), 1750 cm$^{-1}$ (C=O), 1250 cm$^{-1}$ (C—O).

1,2,4,5-Tetracarboxy-3,6-diphenylbenzene (5)

A solution 3.0 g (6.9 m mol) of 4 and 3.0 g (0.75 m mol) of NaOH in 30 ml of $H_2O$ is stirred and heated to reflux for 24 hours. After the solution is diluted with 10 ml of $H_2O$ and allowed to cool to ambient temperature it is slowly added to 10 ml of stirred concentrated HCl. The precipitate that forms is collected by filtration, washed with $H_2O$, and dried at 100° C. under reduced pressure to afford 2.7 g (96 percent) of white powder: mp 300° C. (sublimation); IR (KBr) 3600-2400 cm$^{-1}$ (COOH), 1750 cm$^{-1}$ (C=O).

3,6-Diphenylpromellitic dianhydride (V)

Compound 5 (3 g, 7.4 m mol) is heated at 210° C. under reduced pressure for 4 hours. The product is recrystallized from toluene to afford 1.86 g (68 percent) of yellow powder: mp 320° C. (sublimation); IR (KBr) 1850 cm$^{-1}$ (anhydride).

While in accordance with the patent statutes, a preferred embodiment and best mode has been presented, the scope of the invention is not limited thereto, but rather is measured by the scope of the attached claims.

What is claimed is:

1. A phenylated polyimide polymer characterized by solubility in NMP and m-creosol and the ability to be solution cast into films and membranes and the presence of repeating units of the formula (VI)

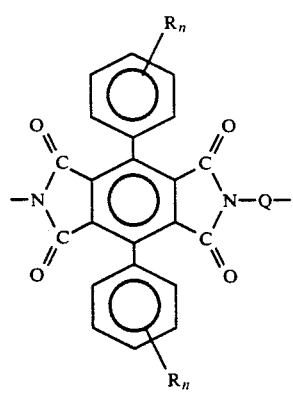
(VI)

where R is an acid or acid derivative, or nitro group and n is an integer between 1 and 4 inclusive and where Q is a divalent organic radical selected from the group consisting of:

(i)

where the terminal covalent bonds are either in the meta or para positions with respect to each other;

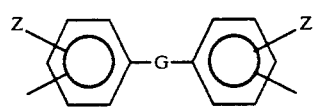
(ii)

where G is O, S, keto, sulfoxy, sulfonyl or a linking bond, Z is hydrogen or a halogen atom or alkyl, alkoxy, or halogenated alkyl containing between 1 to 4 carbons, both terminal covalent bonds are located in the meta or para position with respect to G, and Z is located in the ortho or meta position with respect to the covalent bond;

(iii)

where G' is O, S or an isopropylidine group, Z' is hydrogen or phenyl, and both terminal covalent bonds are either in the ortho or meta or para position with respect to G';

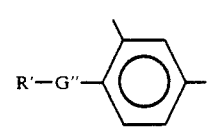
(iv)

where G" is O or S and R' is phenyl, biphenyl, or naphthyl;

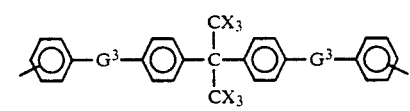
(v)

where $G^3$ is O or S, and both terminal covalent bonds are in the ortho or meta position with respect to $G^3$ and X is H, F, Cl or Br; and

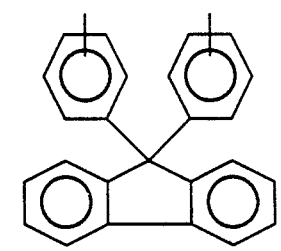
(vi)

where both terminal covalent bonds are in the para or meta position with respect to the fluorene ring covalent bonds.

2. A polymer according to claim 1 in which Q is a divalent organic radical selected from the group consisting of:

(i)

where the terminal covalent bonds are either in the meta or para position with respect to each other.

3. A polymer according to claim 1 in which Q is

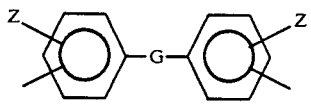
(ii)

where G is O, S, keto, sulfoxy, sulfonyl or a linking bond, Z is hydrogen or a halogen atom or alkyl, alkoxy, or halogenated alkyl containing between 1 to 4 carbons, both terminal covalent bonds are located in the meta or para position with respect to G and Z is located in the ortho or meta position with respect to the covalent bond.

4. A polymer according to claim 3 in which G is O (oxygen). Z is hydrogen and the covalent bonds are located in the para position with respect to G.

5. A polymer according to claim 3 in which G is a linking bond, Z is trifluoromethyl located in the ortho positions with respect to G and the covalent bonds are located in the para position with respect to G.

6. A polymer according to claim 1 in which Q is

(iii)

where G' is O, S or an isopropylidine group and Z' is hydrogen or phenyl, and both terminal covalent bonds are either in the ortho or meta or para position with respect to G.

7. A polymer according to claim 1 in which Q is

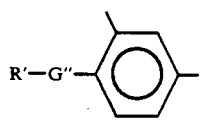
(iv)

where G" is O or S' and R is phenyl, biphenyl, or napthyl.

8. A polymer according to claim 1 in which Q is

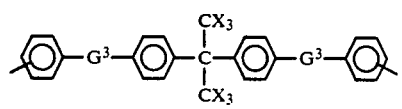
(v)

where $G^3$ is O or S, and both terminal covalent bonds are in the ortho or meta position with respect to $G^3$ and X is H, F, Cl, or Br.

9. A polymer according to claim 1 in which Q is

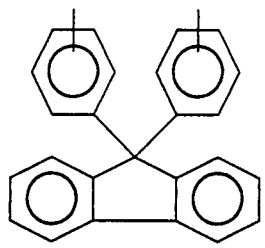
(vi)

where both terminal covalent bonds are in the para or meta position with respect to the fluorene ring covalant bonds.

10. A polymer according to claim 1, said polymer being a homopolymer consisting essentially of repeating units of said formula (VI).

11. A polymer according to claim 1, said polymer being a random copolymer having units of said formula (VI) and units of the formula (XVII)

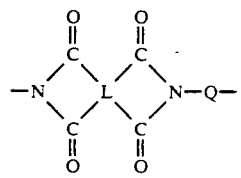
(XVII)

the number of said units of the formula (VI) being at least about 50 percent of the combined numbers of units of the formula (VI) and units of the formula (XVII).

12. A process for preparing a phenylated polyimide polymer having repeating units of the formula (VI)

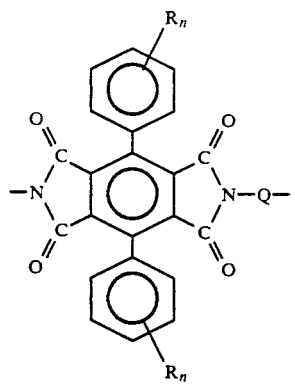
(VI)

where R is an acid or acid derivative, or nitro group and n is an integer between 1 and 4 inclusive and where Q is a divalent organic radical selected from the group consisting of:

(i)

where the terminal covalent bonds are either in the meta or para position with respect to each other;

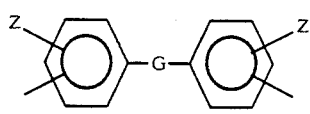 (ii)

where G is O, S, keto, sulfoxy, sulfonyl or a linking bond, Z is hydrogen or a halogen atom or alkyl, alkoxy, or halogenated alkyl containing between 1 to 4 carbons, both terminal covalent bonds are located in the meta or para position with respect to G and Z is located in the ortho or meta position with respect to the covalent bond;

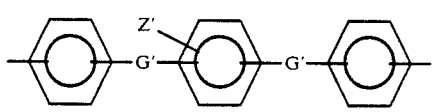 (iii)

where G' is O, S or an isopropylidine group, Z' is hydrogen or phenyl, and both terminal covalent bonds are either in the ortho or meta or para position with respect to G';

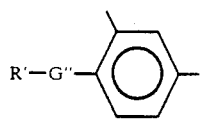 (iv)

where G" is O, or S, and R' is phenyl, biphenyl, or naphthyl;

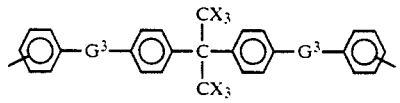 (v)

where $G^3$ is O or S, and both terminal covalent bonds are in the ortho or meta position with respect to $G^3$ and X is H, F, Cl or Br; and

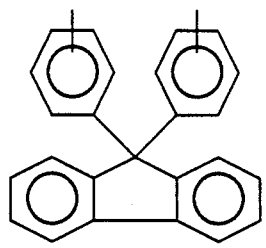 (vi)

where both terminal covalent bonds are in para or meta position with respect to the fluorene ring covalent bonds, which comprises the steps of:

(1) reacting a dianhydride of the formula (VII)

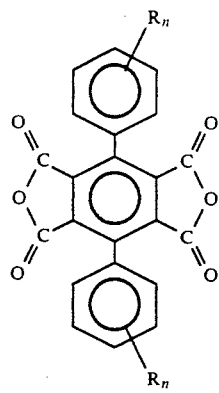 (VII)

(2) with a diamine of the formula (VIII)

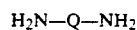

$H_2N-Q-NH_2$ (VIII)

or a mixture thereof, for a time and at a temperature sufficient to synthesize the phenylated polyimide polymer which is characterized by solubility in NMP and m-cresol and the ability of the phenylated polyimide polymer to be solution cast into films and membranes.

13. A process according to claim 12 in which said diamine is 4,4'-oxydianiline.

14. A process according to claim 12 in which said diamine is 2,2'-bis(trifluoromethyl)-4,4'-diaminobiphenyl.

15. A process according to claim 12 in which a mixture of said dianhydride of the formula (VII) and pyromellitic dianhydride formula (II) is reacted with said diamine of the formula (VIII) thereby forming a copolymer having repeating units of said formula (VI) and repeating units of the formula (XX)

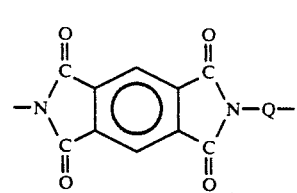 (XX)

said dianhydride of the formula (VII) constituting at least about 50 percent of the combined molar quantities of said dianhydride of the formula (VII) and pyromellitic dianhydride, formula (II), and the number of said units of the formula (VI) being at least about 50 percent of the combined number of said units of the formula (VI) and said units of the formula (XVII).

16. The polymer of claim 1 characterized by being soluble in NMP at 30° C.

17. The polymer of claim 1 characterized by being soluble in m-cresol.

18. The process of claim 12 where N has values of 1 to 4.

19. A phenylated polyimide polymer characterized by the presence of repeating units of the formula (VI)

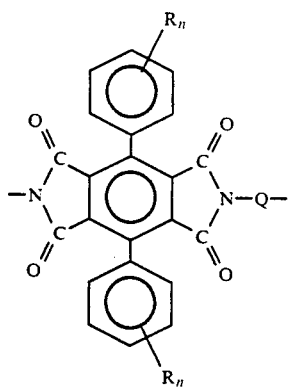

where R is an acid or acid derivative, or nitro group and n is 0 and where Q is a divalent organic radical selected from the group consisting of:

 (i)

where the terminal covalent bonds are either in the meta or para positions with respect to each other;

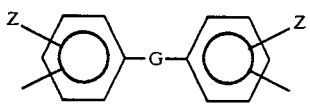 (ii)

where G is O, S, keto, sulfoxy, sulfonyl or a linking bond, Z is hydrogen or a halogen atom or alkyl, alkoxy, or halogenated alkyl containing between 1 to 4 carbon atoms, both terminal covalent bonds are located in the meta or para position with respect to G, and Z is located in the ortho or meta position with respect to the covalent bond;

 (iii)

where G' is O, S or an isopropylidine group, Z' is hydrogen or phenyl, and both terminal covalent bonds are either in the ortho or meta or para position with respect to G';

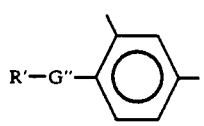 (iv)

where G" is O or S and R' is phenyl, biphenyl, or naphthyl;

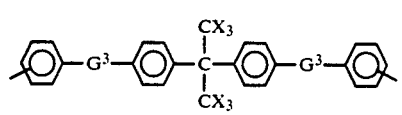 (v)

where $G^3$ is O or S, and both terminal covalent bonds are in the ortho or meta position with respect to $G^3$ and X is H, F, Cl or Br; and

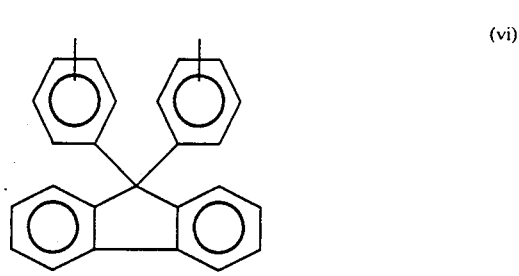 (vi)

where both terminal covalent bonds are in the para or meta position with respect to the fluorene ring covalent bonds.

20. A process for preparing a phenylated polyimide polymer having repeating units of the formula (VI)

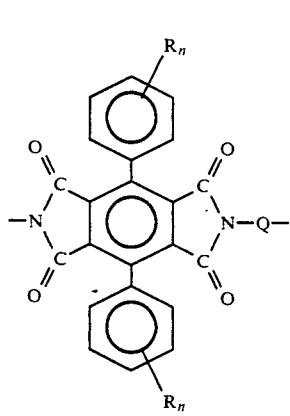 (VI)

where R is an acid or acid derivative, or nitro group and n is 0 and where Q is a divalent organic radical selected from the group consisting of:

 (i)

where the terminal covalent bonds are either in the meta or para position with respect to each other;

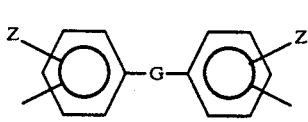 (ii)

where G is O, S, keto, sulfoxy, sulfonyl or a linking bond, Z is hydrogen or a halogen atom or alkyl, alkoxy, or halogenated alkyl containing between 1 to 4 carbons, both terminal covalent bonds are located in the meta or para position with respect to G and Z is located in the ortho or meta position with respect to the covalent bond;

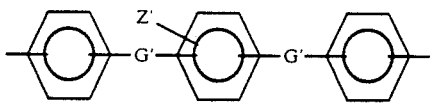

where G' is O, S or an isopropylidine group, Z' is hydrogen or phenyl, and both terminal covalent bonds are either in the ortho or meta or para position with respect to G';

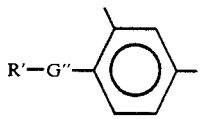

where $G^2$ is O or S and R' is phenyl, biphenyl, or naphthyl;

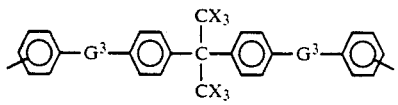

where $G^3$ is O or S, and both terminal covalent bonds are in the ortho or meta position with respect to $G^3$ and X is H, F, Cl or Br; and

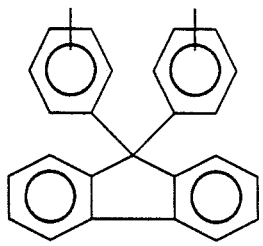

where both terminal covalent bonds are in para or meta position with respect to the fluorene ring covalent bonds, which comprises the steps of (a) reacting a dianhydride of the formula (VII)

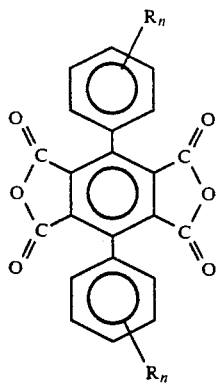

(b) with a diamine of the formula (VIII)

$$H_2N—Q—NH_2 \quad \text{(VIII)}$$

or a mixture thereof, for a time and at a temperature sufficient to synthesize the phenylated polyimide polymer which is characterized by solubility in NMP and m-cresol and the ability of the phenylated polyimide polymer to be solution cast into films and membranes.

21. The process of claim 12 wherein the process further comprises the steps of:
 (a) reacting a dianhydride of formula (VII);
 (b) with a diamine $H_2N—Q—NH_2$ to form a diamine-diacid polyimide precursor; and
 (c) dehydrating the diamine-diacid polyimide precursor to a polyimide of formula (VI).

22. The process of claim 12 wherein the process further comprises the steps of:
 (a) reacting a dianhydride of formula (VII);
 (b) esterifying the dianhydride of formula (VII) with an alcohol to form a diester-diacid;
 (c) adding a diamine $H_2N—Q—NH_2$ to the diester-diacid to form a salt; and
 (d) thermally cyclizing the salt to form a polyimide of formula (VI).

23. The process of claim 12 wherein the process further comprises the steps of:
 (a) reacting a dianhydride of formula (VII) in a refluxing organic solvent; and
 (b) adding a diamine $H_2N—Q—NH_2$ to form a polyimide of formula (VI).

24. The process of claim 20 wherein the process further comprises the steps of:
 (a) reacting a dianhydride of formula (VII);
 (b) with a diamine $H_2N—Q—NH_2$ to form a diamine-diacid polyimide precursor; and
 (c) dehydrating the diamine-diacid polyimide precursor to a polyimide of formula (VI).

25. The process of claim 20 wherein the process further comprises the steps of:
 (a) reacting a dianhydride of formula (VII);
 (b) esterifying the dianhydride of formula (VII) with an alcohol to form a diester-diacid;
 (c) adding a diamine $H_2N—Q—NH_2$ to the diester-diacid to form a salt; and
 (d) thermally cyclizing the salt to form a polyimide of formula (VI).

26. The process of claim 20 wherein the process further comprises the steps of:
 (a) reacting a dianhydride of formula (VII) in a refluxing organic solvent; and
 (b) adding a diamine $H_2N—Q—NH_2$ to form a polyimide of formula (VI).

27. The polymer according to claim 19, said polymer being a homopolymer consisting essentially of repeating units of said formula (VI).

28. The polymer according to claim 1, said polymer being a random copolymer having units of said formula (VI) and units of the formula (XVII)

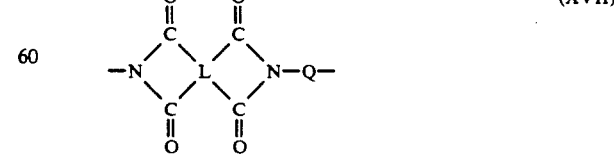

the number of said units of the formula (VI) being at least about 50 percent of the combined numbers of units of the formula (VI) and the units of the formula (XVII).

* * * * *